(12) United States Patent
Rode

(10) Patent No.: US 8,006,573 B1
(45) Date of Patent: Aug. 30, 2011

(54) SYSTEMS AND METHODS FOR PRELOADING A BEARING AND ALIGNING A LOCK NUT

(76) Inventor: John E. Rode, Fonda, NY (US)

(*) Notice: Subject to any disclaimer, the term of this patent is extended or adjusted under 35 U.S.C. 154(b) by 0 days.

(21) Appl. No.: 12/974,040

(22) Filed: Dec. 21, 2010

Related U.S. Application Data

(60) Provisional application No. 61/388,806, filed on Oct. 1, 2010.

(51) Int. Cl.
*G01L 5/00* (2006.01)
(52) U.S. Cl. .................................... 73/862.23
(58) Field of Classification Search ............... 73/862.23, 73/862.322
See application file for complete search history.

(56) References Cited

U.S. PATENT DOCUMENTS

| 6,042,273 | A  | * | 3/2000 | Thrasher ........................ | 384/517 |
| 6,988,832 | B2 | * | 1/2006 | DeWachter et al. ........... | 384/551 |
| 6,993,852 | B2 | * | 2/2006 | Russell et al. ................. | 33/517  |
| 7,428,779 | B2 | * | 9/2008 | Smith et al. ................... | 33/203.18 |

* cited by examiner

*Primary Examiner* — Lisa M Caputo
*Assistant Examiner* — Octavia Davis
(74) *Attorney, Agent, or Firm* — Heslin Rosenberg Farley & Mesiti P.C.

(57) ABSTRACT

An apparatus for use in providing a load on a bearing mounted to a shaft includes a setting gage configured to be received on a shaft and configured to engage a nut on the shaft. The gage includes an inner portion and an outer portion rotatable relative to each other. The inner portion includes an outer perimeter contacting an inner perimeter of the outer portion. The inner portion has an inner opening having an inner circumference mirroring a shape of the shaft and shaped to inhibit movement between the inner portion and the shaft when the shaft is received in the inner opening. The outer portion has an outer circumference comprising at least one radially projecting member configured to engage the nut to inhibit movement between the outer portion and the nut when the gage engages the nut. The inner portion includes a start position indicator on the outer perimeter and a stop position indicator on the outer perimeter. The start position indicator includes a start position for a marker of the outer portion. The stop position includes a stop position for the marker when the outer portion is rotated from the start position toward the stop position such that the marker is aligned with the stop position to achieve a desired amount of endplay of a bearing mounted to the shaft.

21 Claims, 12 Drawing Sheets

SYSTEMS AND METHODS FOR PRELOADING A BEARING AND ALIGNING A LOCK NUT

CROSS-REFERENCE TO RELATED APPLICATIONS

This application is a Non-Provisional of U.S. Provisional Application No. 61/388,806 filed on Oct. 1, 2010, and titled "Systems and Methods for Preloading a Bearing and Aligning a Lock Nut". This application also relates to U.S. application Ser. No. 12/492,826, filed Jun. 26, 2009, titled "Systems And Methods For Preloading A Bearing And Aligning A Lock Nut", U.S. application Ser. No. 11/341,948, filed Jan. 27, 2006, and titled "Method And Apparatus For Preloading A Bearing," published as U.S. Publication No. US2007/0177829A1 on Aug. 2, 2007, and U.S. application Ser. No. 11/354,513, filed Feb. 15, 2006, and titled "Method, Apparatus, and Nut for Preloading a Bearing", issued as U.S. Pat. No. 7,389,579 on Jun. 24, 2008, each of which is incorporated herein by reference.

TECHNICAL FIELD

The present invention relates, generally, to methods and apparatus for preloading antifriction bearings in drive trains, particularly, to preloading and adjusting bearings while monitoring the preload being applied.

BACKGROUND OF THE INVENTION

Various means have been devised to simplify the adjustment of axle bearings, specifically, truck axle bearings. It is generally accepted that in some bearing installations, for example, axle bearings, the life of the bearing will be optimized if the adjustment is made for a slight axial compressive deflection, for example, about 0.003 inches (where this amount is the compressive deflection of the two bearings combined), which is often referred to as "a three thousandths preload." Typical prior art methods of creating these preloads are obtained by applying specified torques to the bearing assembly, for example, by tightening the nut that retains the bearings. However, for several reasons, it is typically extremely difficult to achieve such preload settings under actual in-field conditions, such as in a mechanic shop. For example, the assembly of a heavy truck wheel onto a wheel hub assembly is a relatively cumbersome procedure that hinders the mechanic. Moreover, the wheel hub assembly always includes at least one inner seal, usually a lip type of seal, which can impose a resistive drag torque component to the preload torque, particularly when the seal is new.

In one example, a user may tighten a nut holding a bearing on a shaft to a particular torque and then such nut may be loosened to a particular position by referencing an index mark on a face of the nut a particular distance. Such a nut could be turned a particular portion of a rotation by referencing such a marking, e.g., half a turn. Such an adjustment is a particularly inexact procedure given that wheel nut adjustment is desired to have precision of 0.001 of an inch while the degree of rotation of a nut as described is relatively inexact.

Lock nut systems using a single nut are often utilized to retain a wheel or hub assembly, including axle bearings, on a shaft. Such lock nut systems may be connected to a shaft and inhibit rotation of a retaining nut relative to such shafts. For example, such systems are often utilized on motor vehicles, such as axles and wheel ends. Typically, a lock nut will be engageable with a locking member or keeper which inhibits movement of the nut relative to the shaft. The locking member may include a protruding portion which extends into a slot or receiving portion of a shaft. The locking member may also engage the nut such that there is little or no movement between the nut and shaft.

Thus, a need exists for providing accurate and repeatable procedures and devices for providing and adjusting bearing preload and for adjusting lock nut systems configured to retain preloaded bearings.

SUMMARY OF THE INVENTION

The present provides, in a first aspect, an apparatus for use in providing a load on a bearing mounted to a shaft which includes a setting gage configured to be received on a shaft and configured to engage a nut on the shaft. The gage includes an inner portion and an outer portion rotatable relative to each other. The inner portion includes an outer perimeter contacting an inner perimeter of the outer portion. The inner portion has an inner opening having an inner circumference mirroring a shape of the shaft and shaped to inhibit movement between the inner portion and the shaft when the shaft is received in the inner opening. The outer portion has an outer circumference comprising at least one radially projecting member configured to engage the nut to inhibit movement between the outer portion and the nut when the gage engages the nut. The inner portion includes a start position indicator on the outer perimeter and a stop position indicator on the outer perimeter. The start position indicator includes a start position for a marker of the outer portion. The stop position includes a stop position for the marker when the outer portion is rotated from the start position toward the stop position such that the marker is aligned with the stop position to achieve a desired amount of endplay of a bearing mounted to the shaft.

The present invention provides, in a second aspect, a system for use in providing a load on a bearing mounted to a shaft which includes a setting gage received on a shaft and engaging a nut on the shaft. The gage includes an inner portion and an outer portion moveable relative to each other. The inner portion has an inner opening receiving the shaft and the opening has an inner circumference shaped to inhibit movement between the inner portion and the shaft. The outer portion has an outer circumference including at least one radially projecting member engaging the nut to inhibit movement between the outer portion and the nut. The outer portion has a marker for alignment with the inner portion. The inner portion includes a start position indicator and a stop position indicator. The marker is aligned with the start position indicator in a first position of the nut and the outer portion relative to the inner portion. The marker is aligned with the stop position indicator in a second position of the nut and the outer portion relative to the inner portion. The nut provides a greater endplay of a bearing mounted to the shaft in the second position relative to the first position.

The present invention provides, in a third aspect, a method for providing a load on a bearing mounted to a shaft which includes receiving a setting gage on a shaft and engaging a nut on the shaft. The gage includes an inner portion and an outer portion movable relative to each other. Movement is inhibited between the inner portion and the shaft. At least one radially projecting member of an outer circumference of the outer portion engages the nut to inhibit movement between the outer portion and the nut. The inner portion includes a start position indicator and a stop position indicator. A marker of the outer portion is aligned with the start position indicator when receiving the gage on the shaft. The nut and the outer portion are rotated until the marker is aligned with the stop position indicator to provide a desired endplay by the nut of a bearing mounted to the shaft.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

In accordance with the principals of the present invention, systems and methods for adjusting bearings mounted on a shaft and aligning lock nuts for retaining such bearings are provided. In an exemplary embodiment depicted in FIG. 1, a setting gage 10 is received in and engages a retaining nut 11. The nut and gage may also be received on a wheel hub assembly 20 as depicted in FIG. 2.

Wheel hub assembly 20 is an assembly that would typically be found on a front or rear axle of a cab or tractor of a tractor-trailer, or an axle of a trailer. However, aspects of the invention are not limited to use for vehicle bearings. As will generally be understood by those skilled in the art, aspects of the invention may be used to service bearings and bearing assemblies in any machine or device that employs bearings, including, but not limited to: power trains, transmissions, machine components, on and off-road vehicles, aircraft wheels, marine drives, spacecraft, conveyor rolls, and windmills, among others. According to aspects of the present invention, setting gage 10 and nut 11 may be used in these and any other assembly for which bearing preload and/or endplay is desired, for example, any assembly that utilizes thrust and radial load carrying bearings that are indirectly mounted.

Figure 2:
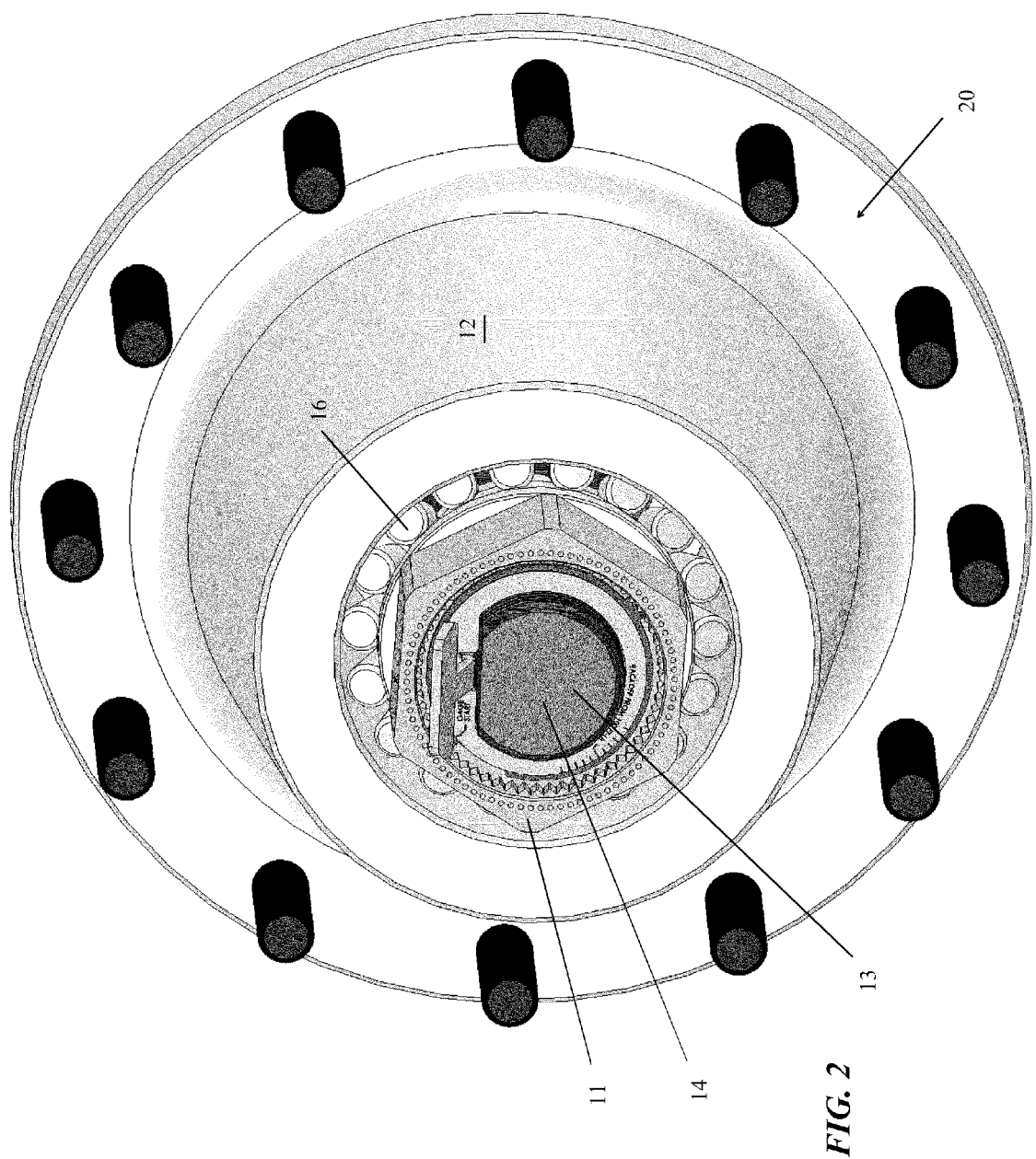
FIG. 2 is a perspective view of the system of FIG. 1 mounted on a bearing assembly.

As shown in FIG. 2, for example, wheel hub assembly 20 includes a wheel hub or, simply, a hub 12, a threaded shaft, axle, or a spindle 14. As is typical, spindle 14 is mounted on two antifriction bearings and spindle 14 includes an exposed end 13, which is typically threaded. Retaining nut 11 is threaded to exposed end 13.

As shown in FIG. 2, as is typical of bearings, outboard bearing 16 includes an inner race (or cone) (not shown), an outer race (or cup) (not shown), a plurality of rollers (not shown), and a roller cage (not shown). Similarly, an inboard bearing (not shown) includes an inner race (or cone) (not shown), an outer race (or cup) (not shown), a plurality of rollers (not shown), and roller cage (not shown). The details of an inboard bearing and an outboard bearing are described and depicted in co-owned U.S. Pat. No. 7,303,367, issued Dec. 4, 2007 (application Ser. No. 11/029,531 filed Jan. 5, 2005), entitled "Lock Nut System"; U.S. Publication No. 2007/0177829A1, published Aug. 2, 2007, (application Ser. No. 11/341,948 filed Jan. 27, 2006), entitled "Method and Apparatus for Preloading a Bearing"; and U.S. Pat. No. 7,389,579, issued Jun. 24, 2008 (application Ser. No. 11/354,513, filed Feb. 15, 2006), entitled "Method, Apparatus, and Nut for Preloading a Bearing", the entirety of which are incorporated herein by reference.

As depicted in FIGS. 5-8, for example, retaining nut 11 may be a locking nut as disclosed in co-owned U.S. Pat. No. 7,303,367 (application Ser. No. 11/029,531 filed Jan. 5, 2005), entitled "Lock Nut System"; U.S. Publication No. 2007/0177829A1 (application Ser. No. 11/341,948 filed Jan. 27, 2006), entitled "Method and Apparatus for Preloading a Bearing"; and U.S. Pat. No. 7,389,579 (application Ser. No. 11/354,513, filed Feb. 15, 2006), entitled "Method, Apparatus, and Nut for Preloading a Bearing". In another example, a retaining nut could be a locking nut as disclosed in U.S. Pat. No. 3,762,455 to Anderson Jr. In the conventional art, retaining nut 11 typically is used to secure a wheel (not shown) or hub assembly to non-rotating axle or spindle 14. However, in aspects of the present invention, retaining nut 11 may be useful in varying the preload and/or endplay of bearing 16. Bearing 16 may be a tapered rollerbearing, or aspects of the invention may be applied to other types of antifriction bearings for which it is desirable to provide preload and/or endplay, for example, spherical roller bearings, deep groove ball bearings, and the like.

Figure 3:
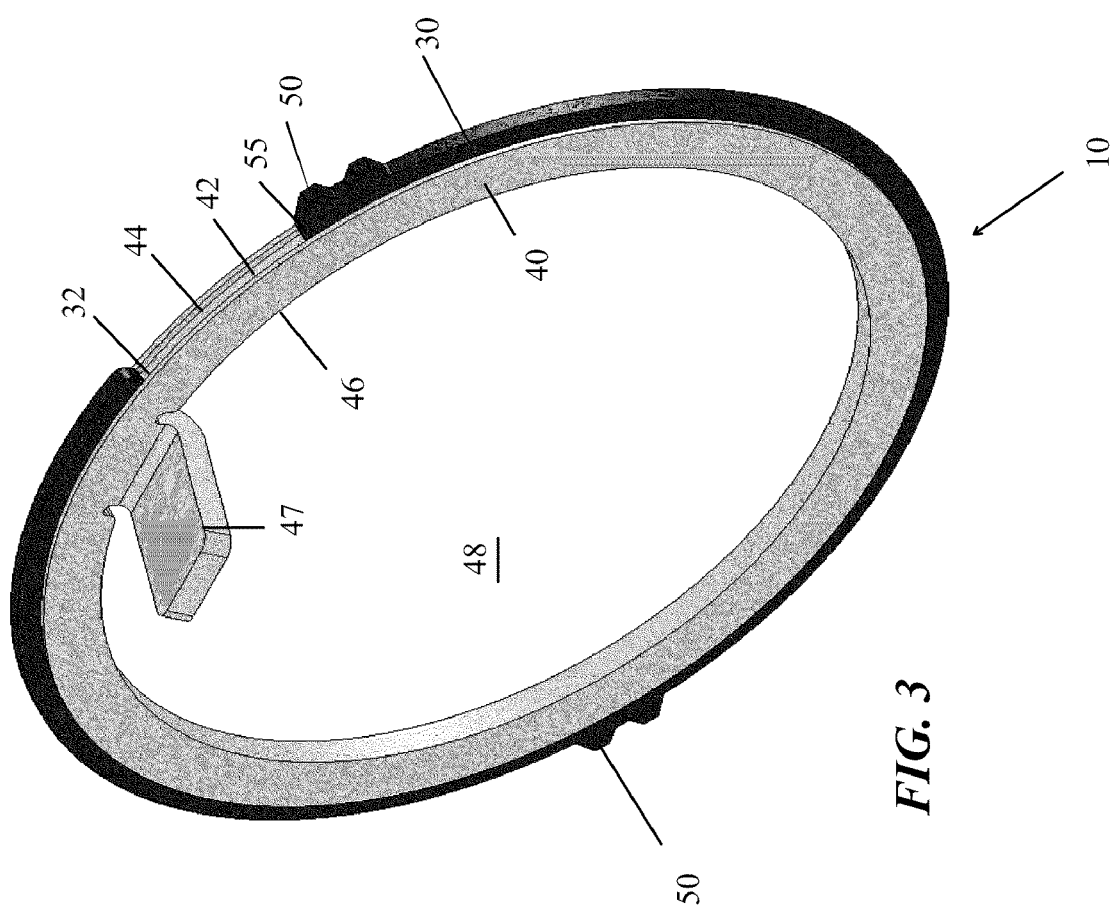
FIG. 3 is a perspective view of a gage usable with a shaft having a keyway in accordance with the present invention.
Figure 4:
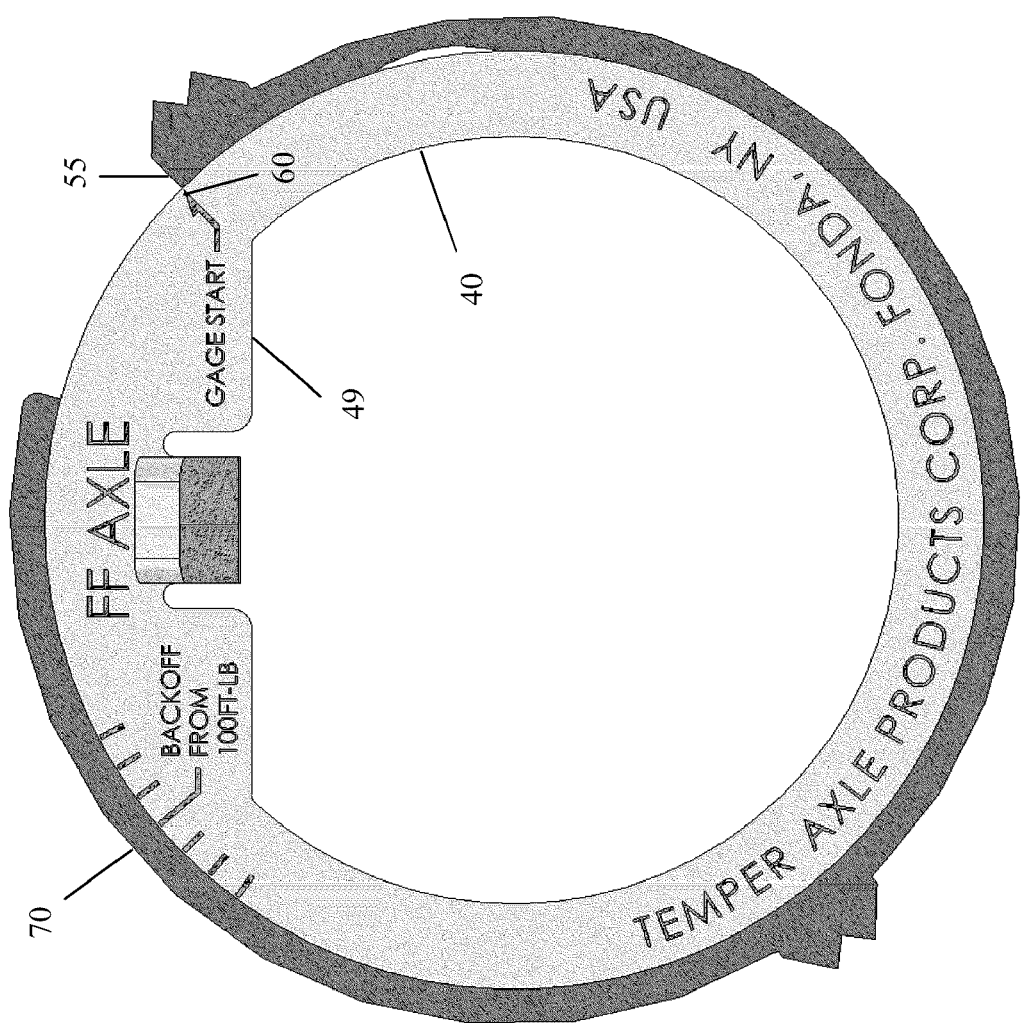
FIG. 4 is a front elevational view of the system of FIG. 1.

As depicted in FIG. 3, gage 10 may include an outer portion 30 and inner portion 40. Inner portion 40 may include an outer perimeter or outer side 42 having a groove 44 for receiving an inner perimeter or inner side 32 of outer portion 30 extending into groove 44. Inner side 32, thus, is configured (e.g., shaped and dimensioned) to be received in such groove. An inner edge or side 46 of inner portion 40 is configured (e.g., shaped and dimensioned) to receive the shaft in an opening 48 defined by side 46. When the shaft is received in opening 48, inner portion 40 and the shaft are inhibited from moving relative to one another. For example, a tab 47 may be shaped to be received in a keyway of the shaft as depicted in FIG. 3. In another example, a flat side 49 (FIGS. 1, 2, 4-6) may be configured (e.g., shaped and dimensioned) to abut a flat side 18 of nut 11. Tab 47 (FIG. 3) and flat side 49 (FIGS. 1, 2, 4-6) may thus inhibit such movement between inner portion 40 and the shaft. As depicted in the figures, inner portion 40 and outer portion 30 may be substantially circular except for such flat portions (e.g., flat portion 49), or keys (e.g., tab 47) and keyways, to conform gage 10 to the shape of the shaft. As will be evident from FIGS. 3 and 4, the gage of FIG. 3 and that of FIG. 4 are identically except that tab 47 is present on FIG. 3 to allow engagement of such tab with a keyway of a shaft while flat side 49 is configured (e.g., shaped and dimensioned) to abut a flat side (e.g., flat side 18) of a shaft having a corresponding flat side.

Figure 1:
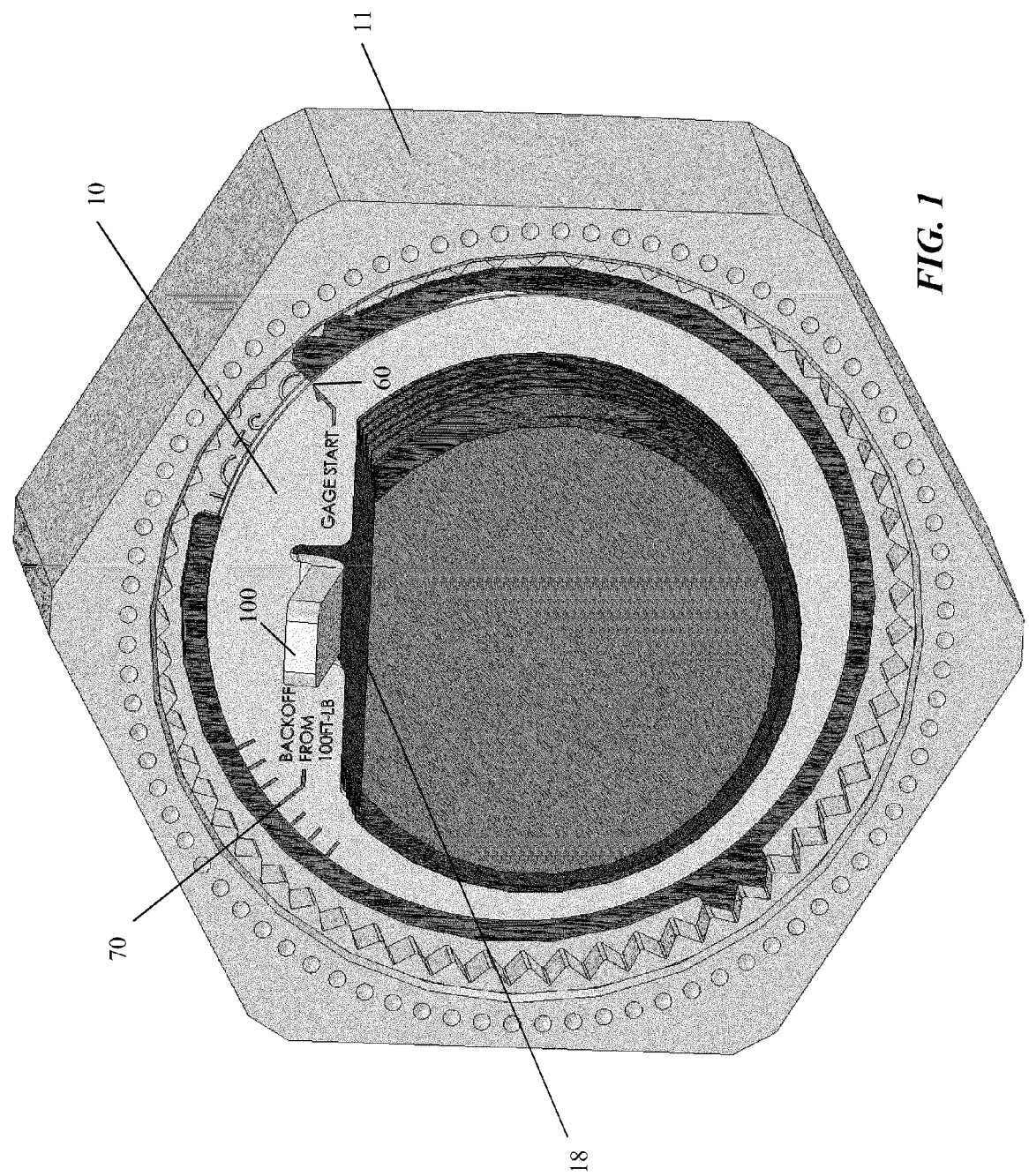
FIG. 1 is perspective view of a system for providing a load on a bearing mounted to a shaft in accordance with the present invention.

Outer portion 30 may include one or more teeth 50 radially protruding and configured (e.g., shaped and dimensioned) to engage engaging teeth 511 (FIGS. 8 and 9) of retaining nut 11 to inhibit movement between retaining nut 11 and outer portion 30. Further, outer portion 30 may also include a marker 55, which may be an edge of outer portion 30 which extends radially at a circumferential end of outer portion 30. Inner portion 40 may also include a start position indicator 60 as depicted in FIGS. 1 and 4, for example. Also, inner portion 40 may also include a stop position indicator 70.

The marker, stop position indicator, and start position indicator could be any kind of groove, mark, etching, ink line, edge or other way of accurately indicating a particular position on the outer and inner portions. Also, the locations of such marker, stop position, and start position may differ according to different types or models of bearing assemblies such that different gages may be marked (e.g., with markings for marker, stop position, and start position) to be used with such different bearing assemblies or axles. The gages may also be labeled as to the appropriate axles or bearing assembly for which they have been calibrated and for which they are intended to be used.

Figure 5:
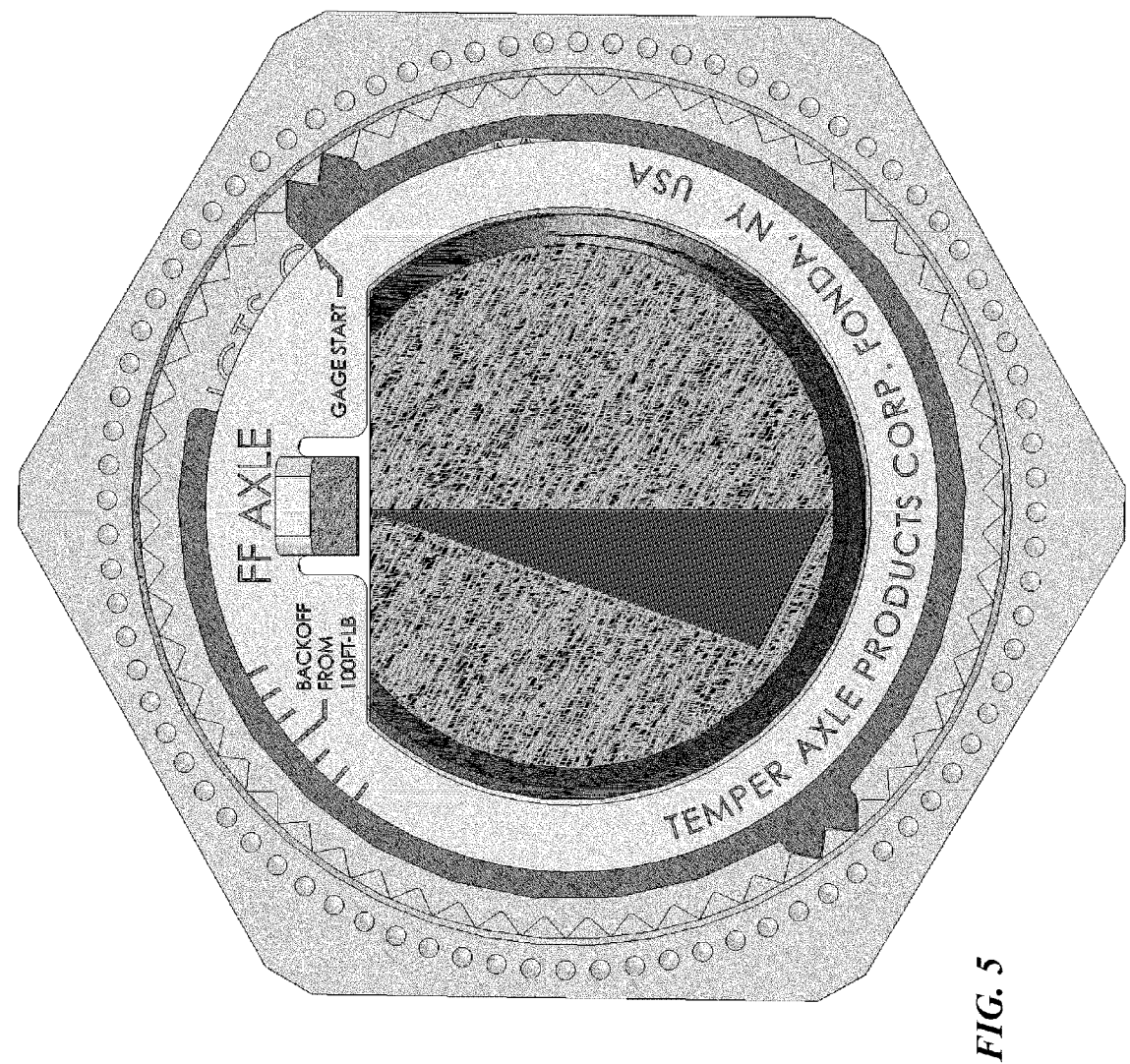
FIG. 5 is a front elevational view of the system of FIG. 1 with the gage of FIG. 3 mounted on a shaft and engaging a lock nut such that an end of an outer portion of the gage is located at a start position of an inner portion of the gage.

As described above, it is desirable for a preload to be provided to a bearing assembly such that a desired amount of endplay is present. After retaining nut 11 is tightened on the shaft to a particular predetermined torque (e.g., using a torque wrench), gage 10 may be placed on the shaft such that the shaft is received in opening 48, teeth 50 engage teeth 511 of retaining nut 11 and marker 55 is aligned with start position indicator 60 as depicted in FIGS. 1, 4 and 5. Outer portion 30 and nut 11 may be rotated (e.g., counterclockwise) until marking 55 reaches stop position 70 as depicted in FIG. 5 to provide a desired amount of endplay to bearing 16. Also, additional markings 72 may be indicated (e.g., located clockwise and/or counterclockwise relative to stop position 70 on inner portion 40 to indicate locations for less or more endplay than the standard amount of endplay indicated by stop position 70). For example, each of additional markings 72 may be separated from each other of such markings to indicate a change of 0.001 in endplay relative to the stop position in the event that more or less endplay is desired. It is desirable that the endplay is adjusted to within 0.001 inch thus the markings on inner portion 40 at this interval are desirable.

After a desired preload has been applied to a bearing assembly, a keeper may be installed to maintain nut 11 in a desired position and therefore maintain a desired endplay. As depicted in FIGS. 7-10, a keeper 530 is engageable with retaining nut 11 and is connected to a keeper retaining member 540. A projection 535 of keeper 530 extends through an opening 545 in retaining member 540 when connected. Projection 535 extends substantially perpendicular to a plane of retaining member 540. Projection 535 may be deformed by pressure applied on a top thereof (i.e. in a direction substantially perpendicular to the plane of retaining member 540) to connect retaining member 540 with keeper 530 similar to the way a rivet is utilized, as will be understood by those skilled in the art.

Keeper 530 and retaining member 540 engage retaining nut 11. For example, keeper 530 includes keeper teeth 520 which are configured to engage engaging teeth 511 of retaining nut 11. Keeper 530 may also include an engaging member 534 which protrudes radially inwardly relative to retaining nut 11 to engage a shaft slot, keyway, groove, flat side 18 or other engaging portion of a shaft (e.g., spindle 14). Thus, engaging member 534 may inhibit movement of keeper 530 relative to a shaft (e.g., spindle 14) and the engagement of engaging teeth 511 with keeper teeth 520 may inhibit movement of keeper 530 relative to retaining nut 11. Accordingly, movement of retaining nut 11 relative to the shaft is prevented or reduced. Keeper 530 and/or nut 11 may be molded or formed of powdered metal, for example.

Keeper retaining member 540 may engage a slot 561 of retaining nut 11. For example, a first leg 542 and a second leg 543 may be received in slot 561. For example, slot 561 may have a radial depth of about 0.050 inches. Further, a nose 544 of retaining member 540 may be received in slot 561. Retaining member 540 when received in slot 561 may align keeper 530 such that keeper teeth 532 are engaged with engaging teeth 511. Further, retaining member 540 provides resistance in an axial direction relative to retaining nut 11 thereby inhibiting movement of keeper 530 axially away from a shoulder 524 toward an outer surface 522.

Retaining member 540 may be elastically deformable to allow it to be received in slot 561. For example, first leg 542 and second leg 543 may be deformed (e.g., in a direction substantially perpendicular to the axis of retaining nut 11) toward one another prior to being inserted axially past outer surface 522 of retaining nut 11 to allow retaining member 540, and keeper 530 to be attached thereto. First leg 542 and second leg 543 may then be elastically returned toward slot 561. First leg 542 may also include a gripping member 568 and second leg 543 may include a second gripping member 569. The gripping members are substantially parallel to one another and are aligned at about 90 degrees from a plane of retaining member 540. A user may grip the gripping members and move them towards one another as described above to allow the retaining member to be received in slot 561. The gripping members may be monolithically formed relative to the remainder of retaining member 540 or they may be attached thereto via welding or other means of fastening.

Also, first leg 542 may include a protruding portion 560 which protrudes radially relative to a rounded portion 565 of retaining member 540. Similarly, second leg 543 may include a protruding portion 562. Protruding portion 560 and protruding portion 565 may extend into slot 561 to engage retaining member 540 with slot 561. Further, protruding portion 560 may include a groove 566 and protruding portion 562 may include a groove 567. For example, retaining member 540 may be formed of stamped sheet metal, and may have a thickness in a range between 0.040-0.050 inches, as will be understood by those skilled in the art. Alternatively, retaining member 540 could be formed of other materials (e.g., powdered metal) and/or formed in other shapes to allow retaining member 540 to be received in slot 561 and to be connected to keeper 540 via projection 535. Further, keeper 530 may be formed or molded of powdered metal, for example. Alternatively, keeper 530 and retaining member 540 could be formed integral or monolithic relative to one another.

Figure 7:
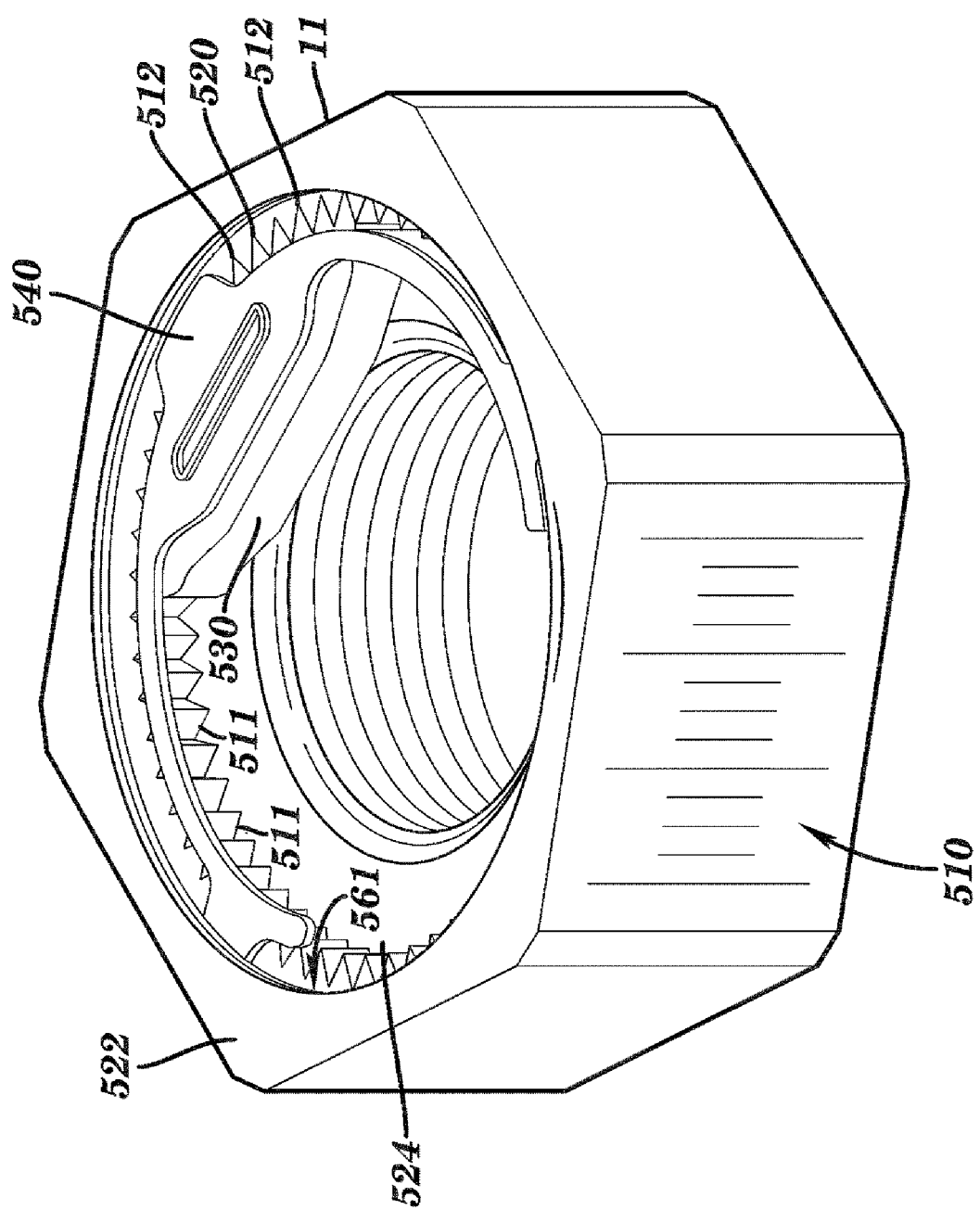
FIG. 7 is a perspective view of the system of FIG. 1 with the gage removed therefrom and a keeper engaging the nut and shaft.
Figure 8:
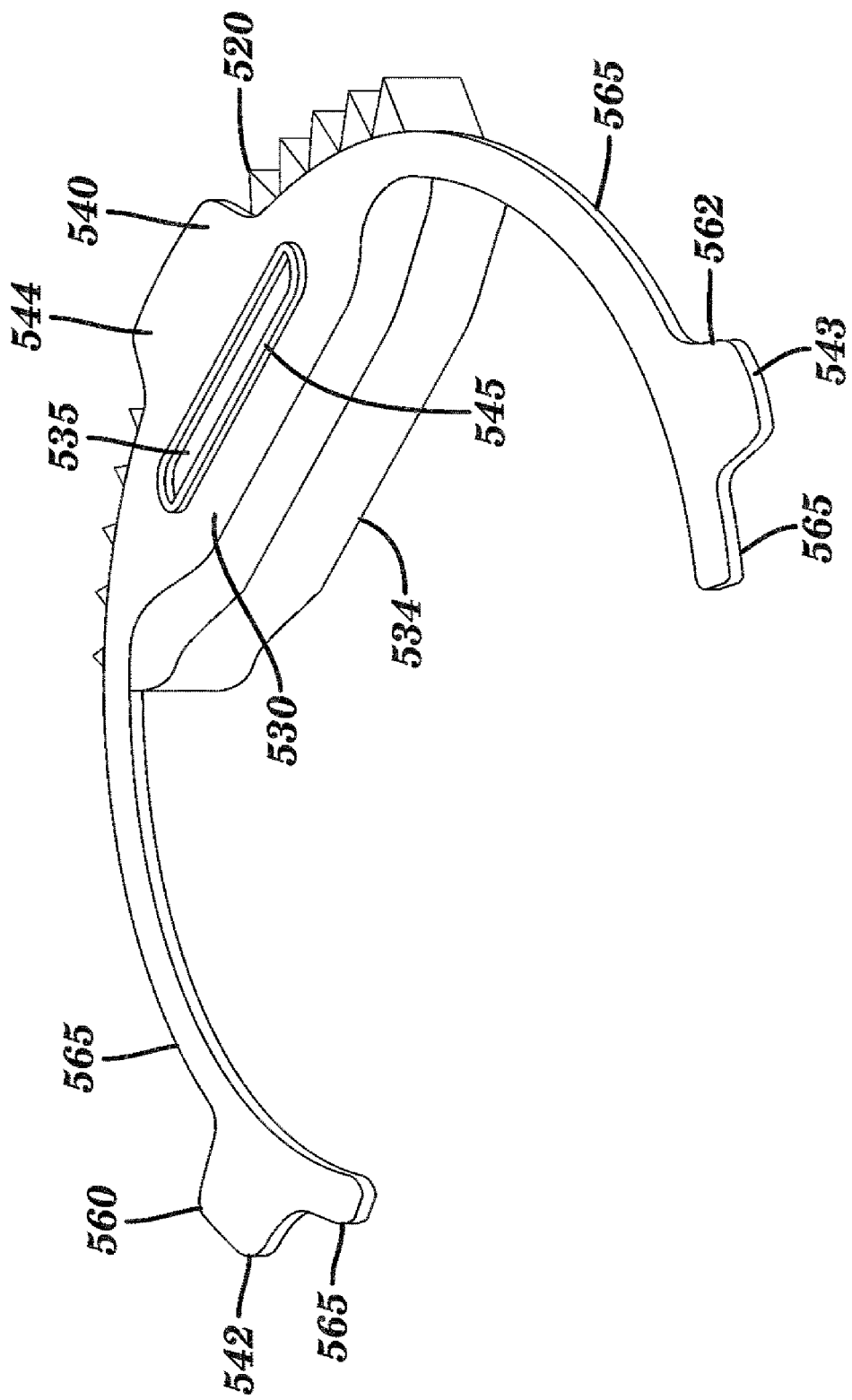
FIG. 8 is a is a perspective view of the keeper and keeper retaining member of FIG. 7.
Figure 9:
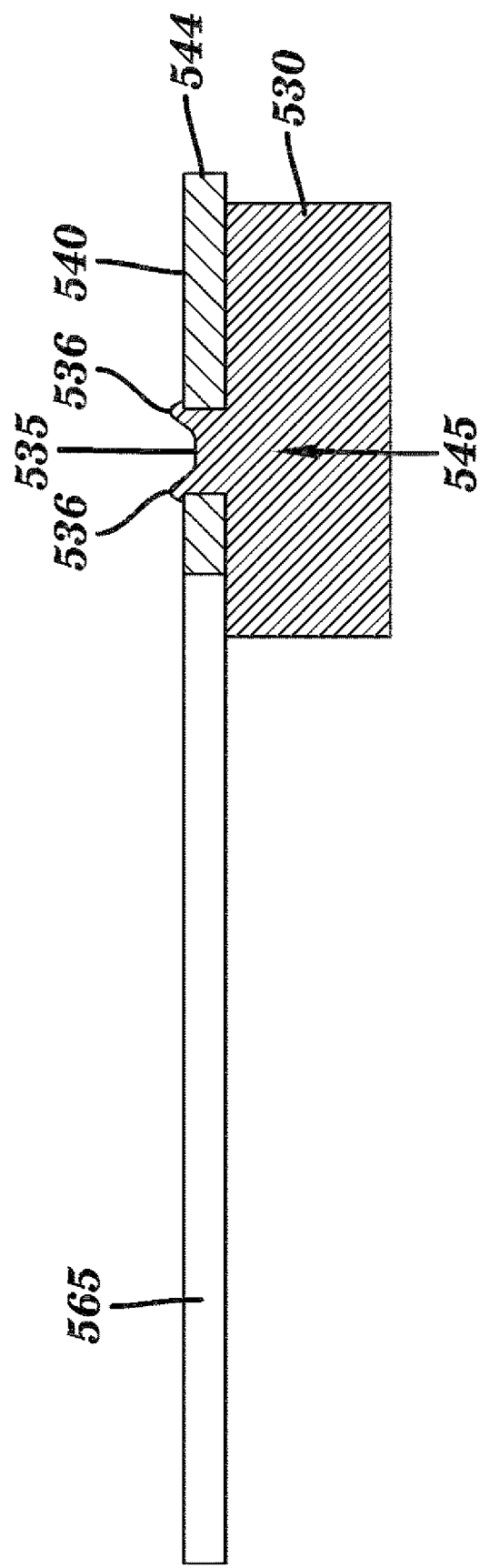
FIG. 9 is a is a side cross-sectional view of the keeper connected with the keeper retaining member of FIG. 7.
Figure 10:
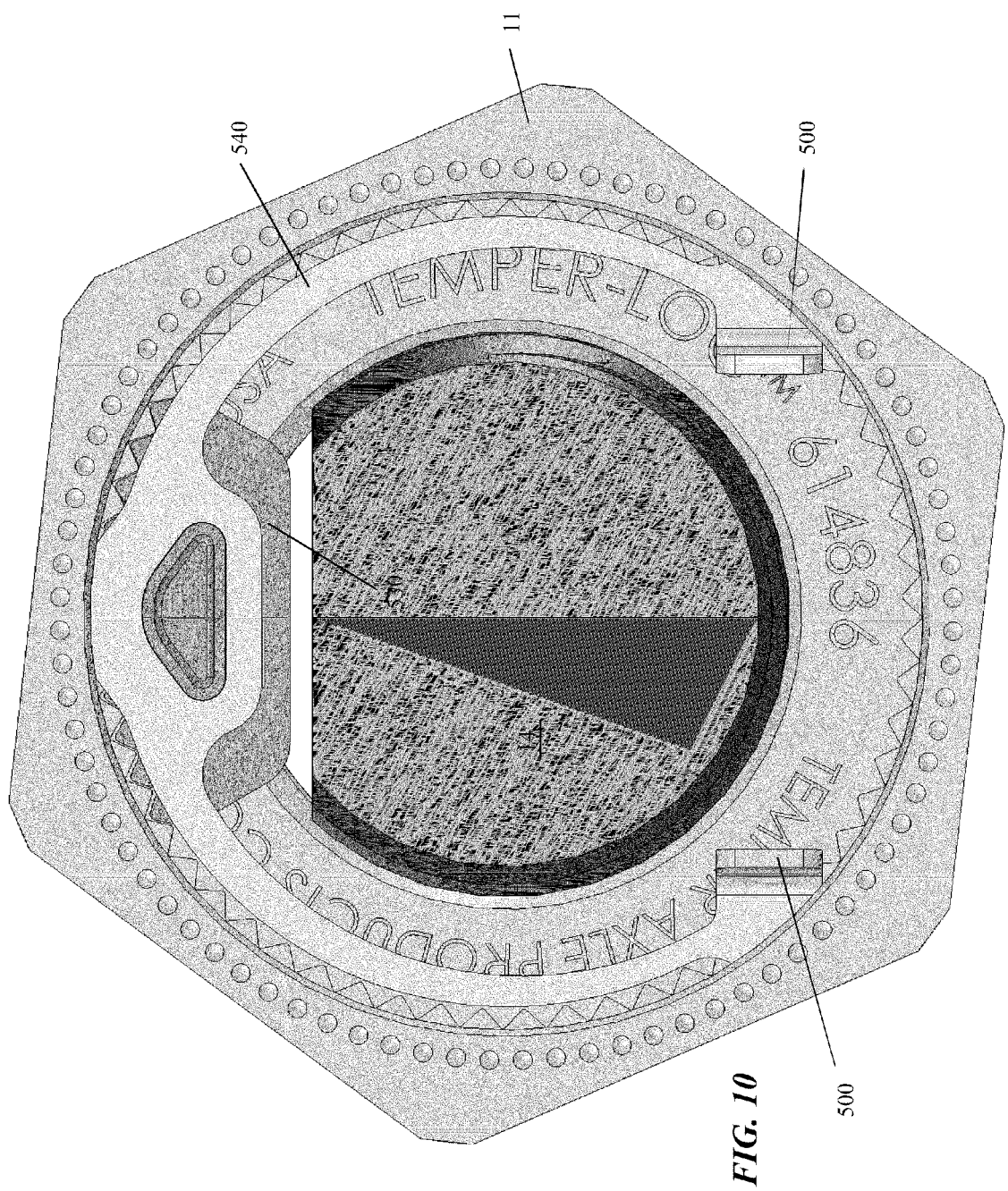
FIG. 10 is a front elevational view of the system of FIG. 1 with the gage received and a keeper engaging the nut and shaft.
Figure 11:
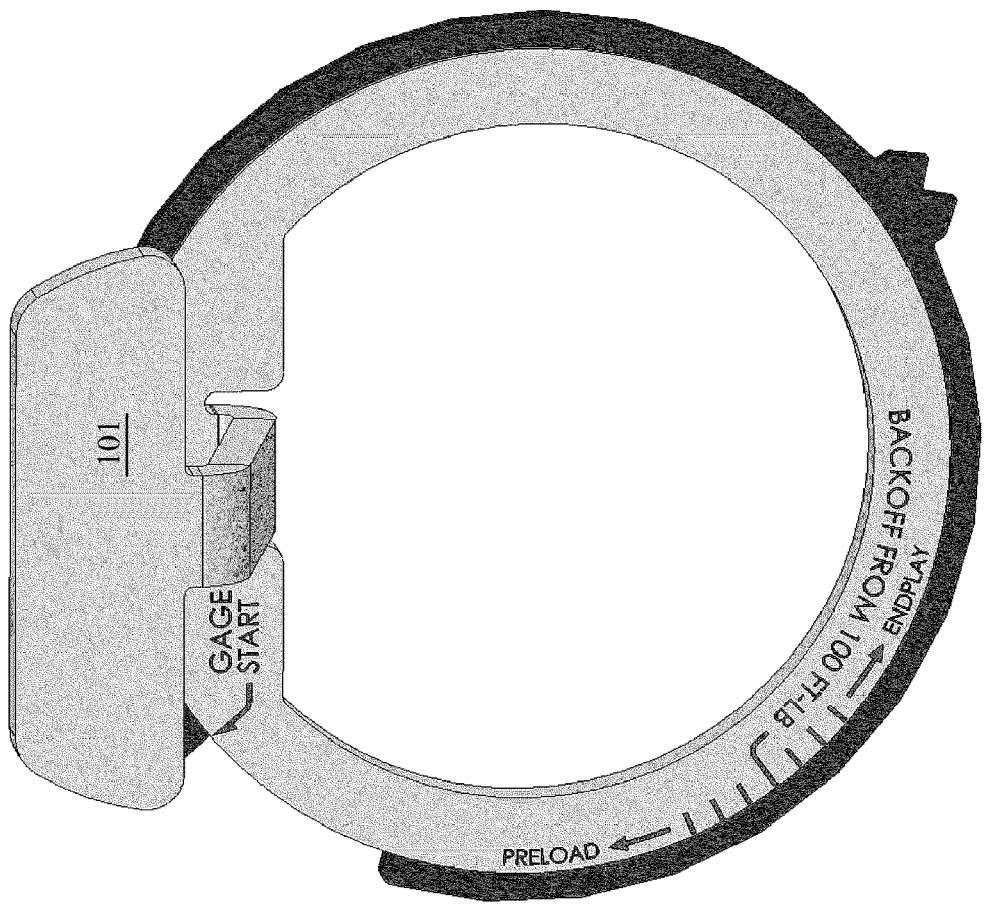
FIG. 11 is a front elevational view of another embodiment of a gage for use in providing a load on a bearing mounted to a shaft.
Figure 12:
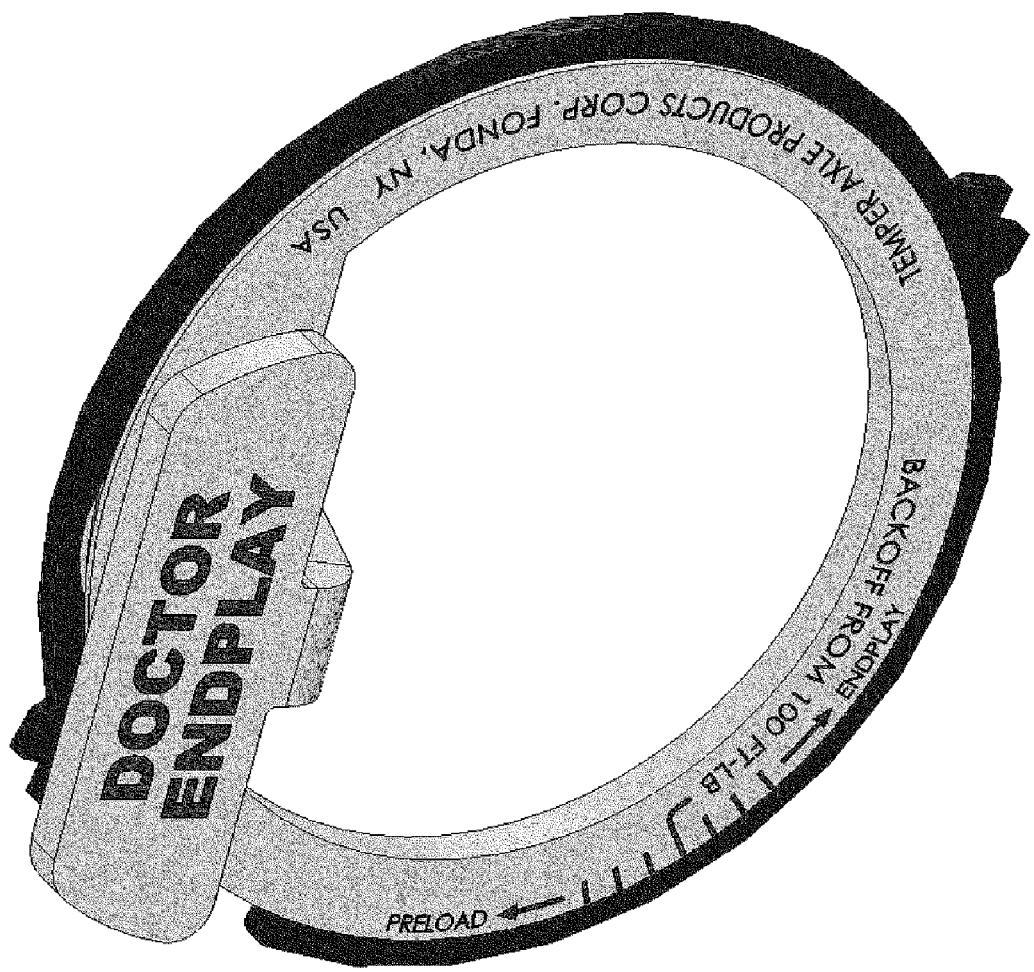
FIG. 12 is a perspective view of the gage of FIG. 11.

FIG. 10 depicts another example of a keeper and retaining member engaging retaining nut 11 with the keeper and retaining member being almost identical to keeper 530 and retaining member 540 of FIGS. 7-9. The keeper depicted in FIG. 10 includes tabs 500 which allow a user to more easily grasp the retaining member to elastically deform the legs thereof toward one another to facilitate insertion of the protruding portions of the legs into slot 561 of nut 11. These tabs are the sole difference between the example in FIGS. 7-9 and that in FIG. 10.

Further, keeper 530 and/or nut 11 may be fabricated from any one or more of the structural metals, for example, carbon steel or stainless steel. Nut 11 may be fabricated by machining from a billet or plate, by forging or casting and then finished machining, or fabricated by conventional powder metallurgy techniques. In one aspect, when formed by powder metallurgy, the material may be FC 0208, or its equivalent. Nut 11 may also be surface hardened, for example, induction hardened, carburized, or nitrided, among other surface hardening methods; in one aspect, the exposed surfaces on end 241 of nut 220 may be hardened, for example, induction hardened.

An example of a step by step method for providing endplay to a bearing assembly as per the above description follows:
1—Tighten nut 11 to at least 200 ft-lb while spinning a wheel.
2—Back off nut 11 one half turn.
3—Re-tighten nut 11 to 100 ft-lb and spin the wheel.
4—Re-tighten again to assure that the 100 ft-lb is still applied.
5—Set marker 55 of outer portion 30 of gage 10 to start position 60 and insert it over axle 14 and against nut 11 to engage teeth 511 of the nut.
6—Back off nut 11 to stop position 70.
7—Inspect the result by applying a dial indicator to check end play.
8—Fine tune the adjustment if necessary by tightening or loosening nut 11 a number of index marks 72 where each division represents 0.001" change.
9—Insert keeper 530 to engage groove 561 in nut 11 and the keyway or flat in the axle.
10—Finally, inspect the installation.

Also, in one example, gage 10 may be utilized as a verification measuring device. If a wheel setting is suspect because no endplay can be measured or observed for example, gage 10 may be inserted with marker 55 positioned at a first additional marking 73 of additional markings 72 and the nut loosened (e.g., by rotating counterclockwise) by a specific number of indexed divisions (e.g., additional markings 72), each being marked to indicate a change of 0.001 inches, to a second division or marking, such as stop position indicator 70. Then end play may be measured using a standard measuring device (e.g., using a dial indicator) and the known end play resulting from the number of divisions moved (e.g., 0.001 inches per division) may be subtracted from the measured end play to determine the original position prior to the nut being loosened. For example, the resulting difference being a negative number indicates the degree of preload that had been on the wheel bearing assembly prior to the nut being loosened.

An example of a step by step method for determining a load on a bearing assembly as per the above description follows:
1—Set marker 55 of outer portion 30 of gage 10 to a first division 73 and insert the gage over axle 14 and against nut 11 to engage teeth 511 of the nut.
2—Back off nut 11 to stop position 70 (or another of additional divisions or markings 72).
3—Measure the end play by applying a dial indicator.
4—Calculate a difference in endplay from first division 73 to stop position 70 where each division represents a 0.001" change
5—Compare the measured endplay to the calculated difference in endplay to determine the amount of endplay that existed prior to the loosening of the nut.

Figure 6:
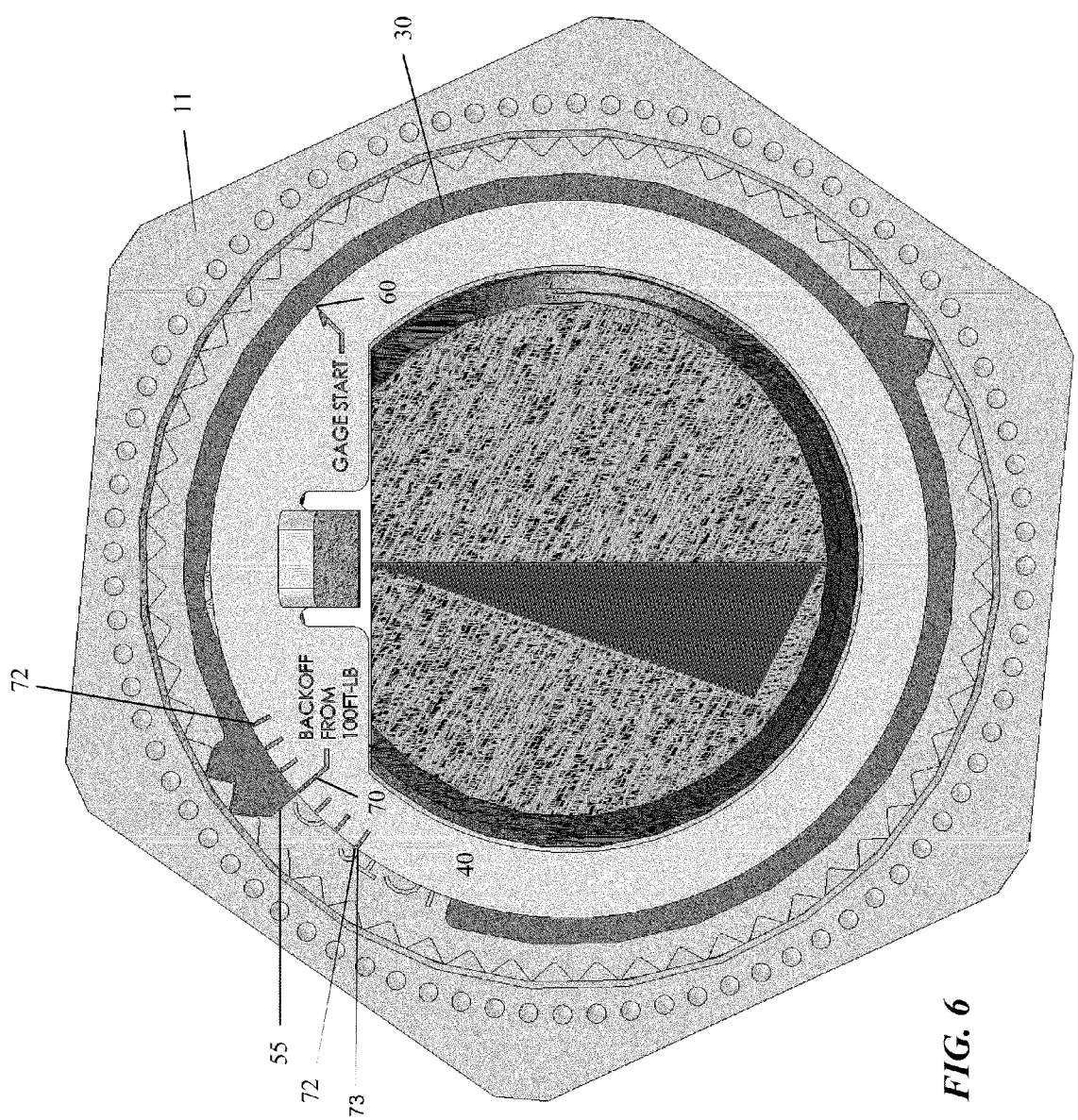
FIG. 6 is a front elevational view of the system of FIG. 5 with the marker of the outer portion of the gage moved to be aligned with a stop position of the inner portion of the gage.

As will be evident from the figures, FIGS. 1 and 5-6 depict gage 10 with handle 100 to allow manipulation thereof by the user while FIGS. 2 and 9-10 depict gage 10 with a wider handle 101 to allow the user with the opportunity for a wider grip.

Although aspects of the present invention were described above with respect to their application to wheel hub assemblies, for example, truck wheel hub assemblies, it is understood that aspects of the present invention may be applied to any vehicle, machine, or component having at least one bearing.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. An apparatus for use in providing a load on a bearing mounted to a shaft, the apparatus comprising:
a setting gage configured to be received on a shaft and configured to engage a nut on the shaft;
said gage comprising an inner portion and an outer portion rotatable relative to each other, said inner portion comprising an outer perimeter contacting an inner perimeter of said outer portion;
said inner portion having an inner opening having an inner circumference mirroring a shape of the shaft and shaped to inhibit movement between said inner portion and the shaft when the shaft is received in said inner opening;
said outer portion having an outer circumference comprising at least one radially projecting member configured to engage the nut to inhibit movement between said outer portion and the nut when said gage engages the nut; and
said inner portion comprising a start position indicator on said outer perimeter and a stop position indicator on said outer perimeter, said start position indicator comprising a start position for a marker of said outer portion, said stop position comprising a stop position for said marker when said outer portion is rotated from said start position toward said stop position such that said marker is aligned with said stop position to achieve a desired amount of endplay of a bearing mounted to the shaft.

2. The apparatus of claim 1 wherein said start position indicator and said stop position indicator are circumferentially spaced from each other such that the endplay comprises 0.001 inch when said marker is aligned with said stop position indicator.

3. The apparatus of claim 1 wherein said marker comprises an edge of said outer portion.

4. The apparatus of claim 1 wherein said at least one radially projecting member comprises a plurality of teeth configured to engage a plurality of nut teeth of said nut.

5. The apparatus of claim 1 wherein said inner portion comprises an outer circumferential groove receiving said outer portion therein.

6. The apparatus of claim 1 wherein said stop position indicator comprises a plurality of additional stop positions indicating a plurality of amounts of possible endplay positions of the nut.

7. A system for use in providing a load on a bearing mounted to a shaft, the system comprising:
a setting gage received on a shaft and engaging a nut on the shaft;
said gage comprising an inner portion and an outer portion movable relative to each other;
said inner portion having an inner opening receiving said shaft, said opening having an inner circumference shaped to inhibit movement between said inner portion and said shaft;
said outer portion having an outer circumference comprising at least one radially projecting member engaging said nut to inhibit movement between said outer portion and said nut, said outer portion having a marker for alignment with said inner portion;

said inner portion comprising a start position indicator and a stop position indicator, said marker aligned with said start position indicator in a first position of said nut and outer portion relative to said inner portion, said marker aligned with said stop position indicator in a second position of said nut and outer portion relative to said inner portion, said nut providing a greater endplay of a bearing mounted to the shaft in said second position relative to said first position.

8. The system of claim 7 wherein said start position indicator and said stop position indicator are circumferentially spaced from each other such that the endplay comprises 0.001 inch.

9. The system of claim 7 wherein said marker comprises an edge of said outer portion.

10. The system of claim 7 wherein said at least one radially projecting member comprises a plurality of teeth engaging nut teeth of the nut.

11. The system of claim 7 wherein said inner portion comprises an outer circumferential groove receiving said outer portion therein.

12. The system of claim 7 wherein said stop position indicator comprises a plurality of additional stop positions indicating a plurality of amounts of possible endplay positions of the nut.

13. The system of claim 7 wherein said inner portion and said outer portion are rotatable relative to each other.

14. A method for providing a load on a bearing mounted to a shaft, the method comprising:
   receiving a setting gage on a shaft and engaging a nut on the shaft;
   the gage comprising an inner portion and an outer portion movable relative to each other;
   inhibiting movement between the inner portion and the shaft;
   at least one radially projecting member of an outer circumference of the outer portion engaging the nut to inhibit movement between the outer portion and the nut;
   the inner portion comprising a start position indicator and a stop position indicator;
   aligning a marker of the outer portion with the start position indicator when receiving the gage on the shaft; and
   moving said nut and said outer portion until said marker is aligned with said stop position indicator to provide a desired endplay by the nut of a bearing mounted to the shaft.

15. The method of claim 14 wherein the moving the nut and the outer portion comprises rotating the outer portion in a groove of the inner portion.

16. The method of claim 14 wherein the aligning the marker of the outer portion with the start position indicator comprises aligning an end of the outer portion with the start position indicator.

17. The method of claim 14 further comprising removing the setting gage and engaging a keeper and keeper retaining member with the nut and the shaft to inhibit movement of the shaft relative to the nut.

18. The method of claim 14 further comprising moving the marker to an additional marking of the inner portion to adjust the end play.

19. A method for determining a load on a bearing mounted to a shaft, the method comprising:
   receiving a setting gage on a shaft and engaging a nut on the shaft;
   the gage comprising an inner portion and an outer portion movable relative to each other;
   inhibiting movement between the inner portion and the shaft;
   at least one radially projecting member of an outer circumference of the outer portion engaging the nut to inhibit movement between the outer portion and the nut;
   the inner portion comprising a plurality of divisions, the divisions substantially equally spaced along the inner portion;
   aligning a marker of the outer portion with a first division of the plurality of divisions when receiving the gage on the shaft;
   moving the nut and the outer portion until the marker is aligned with a second division of the plurality of divisions;
   measuring the endplay of the bearing using a measurement device coupled to the bearing resulting in an actual measurement;
   comparing a position of the first division to a position of the second division along the inner portion to determine a calculated difference in endplay achieved from the movement of the nut and the outer portion from the first division to the second division; and
   comparing the calculated difference to the actual measurement to determine an endplay of the bearing prior to the movement of the nut and the outer portion.

20. The method of claim 19 wherein the moving the nut and the outer portion comprises rotating the outer portion in a groove of the inner portion.

21. The method of claim 19 wherein the aligning the marker of the outer portion with the first division comprises aligning an end of the outer portion with the first division.

* * * * *